United States Patent
Bowers et al.

[11] Patent Number: 6,106,006
[45] Date of Patent: Aug. 22, 2000

[54] VEHICLE OCCUPANT PROTECTION APPARATUS INCLUDING AN INFLATABLE CURTAIN AND A HOUSING CONTAINING THE CURTAIN

[75] Inventors: Paul A. Bowers, Ray; Daniel R. Sutherland, Eastpointe, both of Mich.

[73] Assignee: TRW Vehicle Safety Systems Inc., Lyndhurst, Ohio

[21] Appl. No.: 09/287,002

[22] Filed: Apr. 6, 1999

[51] Int. Cl.[7] .................................................. B60R 21/22
[52] U.S. Cl. ................................................... 280/730.2
[58] Field of Search .......................................... 280/730.2

[56] References Cited

U.S. PATENT DOCUMENTS

| | | |
|---|---|---|
| 3,733,088 | 5/1973 | Stephenson . |
| 3,897,961 | 8/1975 | Leising et al. . |
| 5,755,457 | 5/1998 | Specht .................................. 280/728.2 |
| 5,791,683 | 8/1998 | Shibata et al. ....................... 280/730.2 |
| 5,899,486 | 5/1999 | Ibe ....................................... 280/730.2 |
| 5,921,575 | 7/1999 | Kretschmer et al. ................. 280/730.2 |
| 5,957,487 | 9/1999 | Stütz .................................... 280/730.2 |

FOREIGN PATENT DOCUMENTS

| | | |
|---|---|---|
| 29610920 U | 8/1998 | Germany . |
| 2297950 | 8/1996 | United Kingdom . |
| 9822313 | 5/1998 | WIPO . |

*Primary Examiner*—Kenneth R. Rice
*Attorney, Agent, or Firm*—Tarolli, Sundheim, Covell, Tummino & Szabo L.L.P.

[57] ABSTRACT

An apparatus (10) includes an inflatable vehicle occupant protection device (12) and a housing (42) containing the protection device (12). The housing (42) has a seam (54). The apparatus (10) further includes a conduit (40) configured to convey inflation fluid to the protection device (12). The conduit (40) is deflectable under the influence of pressure forces applied by the inflation fluid, and is located adjacent to the seam (54) in the housing (42). The conduit (40) can thus transmit fluid pressure forces to the housing (42) along the seam (54) so as to open the housing (42) along the seam (54) upon deflecting under the influence of the fluid pressure forces. Preferably, the conduit (40) is a tubular extrusion extending along an elongated vehicle frame member (34) having a non-linear contour. The tubular extrusion (40) has a non-linear contour matching the non-linear contour of the frame member (34).

11 Claims, 2 Drawing Sheets

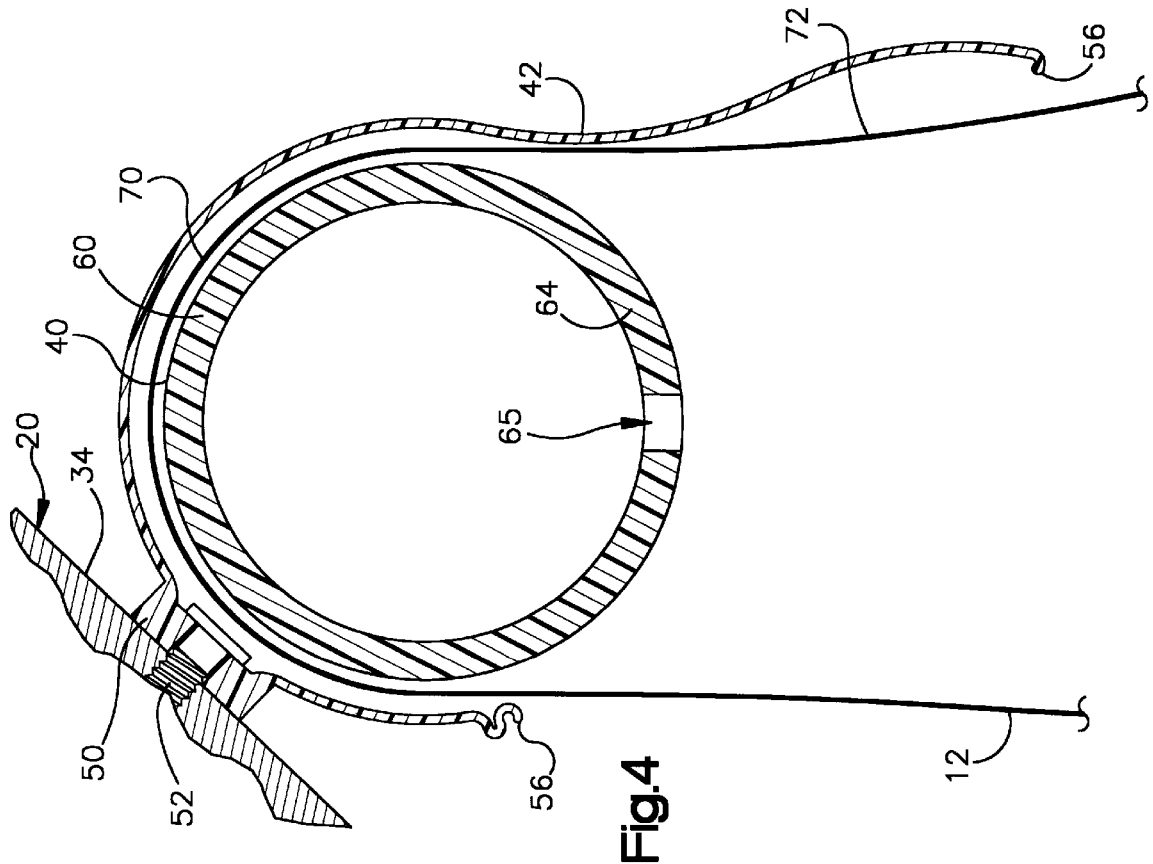
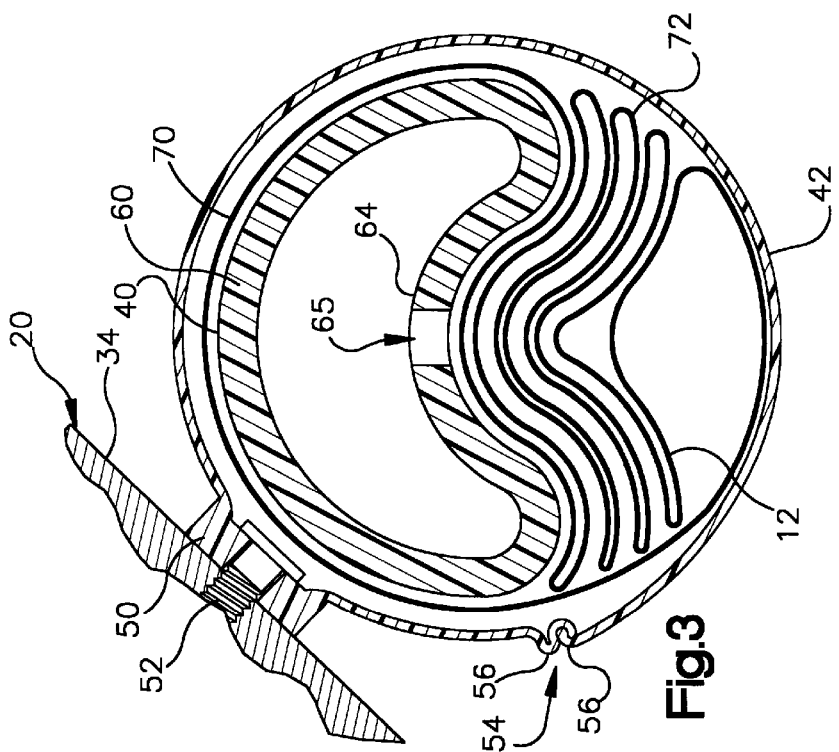

6,106,006

VEHICLE OCCUPANT PROTECTION APPARATUS INCLUDING AN INFLATABLE CURTAIN AND A HOUSING CONTAINING THE CURTAIN

FIELD OF THE INVENTION

The present invention relates to a housing for containing an inflatable vehicle occupant protection device in a vehicle, and particularly relates to a housing containing an inflatable curtain.

BACKGROUND OF THE INVENTION

Vehicle crash forces may tend to cause relative movement between an occupant of a vehicle and a vehicle window so that the occupant effectively moves toward the vehicle window. For example, side impact crash forces and rollover crash forces may tend to cause relative movement toward each other of a vehicle occupant and a window at the side of the vehicle. Front impact and rear impact crash forces may tend to cause relative movement toward each other of, respectively, an occupant of a front seat and the windshield, and an occupant of a rear seat and the rear window. Therefore, a vehicle may be equipped with a curtain for restraining movement of an occupant toward a window under the influence of vehicle crash forces. Such a curtain may comprise an inflatable structure which is stored in a folded, uninflated condition. The inflatable curtain is part of an apparatus that may further include a housing in which the curtain is stored. The housing is typically located within the vehicle roof structure above the corresponding window.

SUMMARY OF THE INVENTION

In accordance with a principal feature of the present invention, an apparatus includes an inflatable vehicle occupant protection device and a housing containing the protection device. The housing has a seam. The apparatus further includes a conduit configured to convey inflation fluid to the protection device. The conduit is deflectable under the influence of pressure forces applied by the inflation fluid and is located adjacent to the seam in the housing. The conduit can thus transmit fluid pressure forces to the housing along the seam so as to open the housing along the seam upon deflecting under the influence of the fluid pressure forces.

In accordance with another principal feature of the present invention, an apparatus includes an elongated vehicle frame member having a non-linear contour. The apparatus further includes an inflatable vehicle occupant protection device and a conduit configured to convey inflation fluid to the protection device. The conduit comprises a tubular extrusion extending along the frame member. The tubular extrusion has a non-linear contour matching the non-linear contour of the frame member.

BRIEF DESCRIPTION OF THE DRAWINGS

The foregoing and other features of the present invention will become apparent to those skilled in the art to which the present invention relates upon reading the following description with reference to the accompanying drawings, wherein:

FIG. 3 is a view taken on line 3—3 of FIG. 2;

FIG. 4 is a view taken on line 4—4 of FIG. 1; and

DESCRIPTION OF PREFERRED EMBODIMENTS

Figure 1:
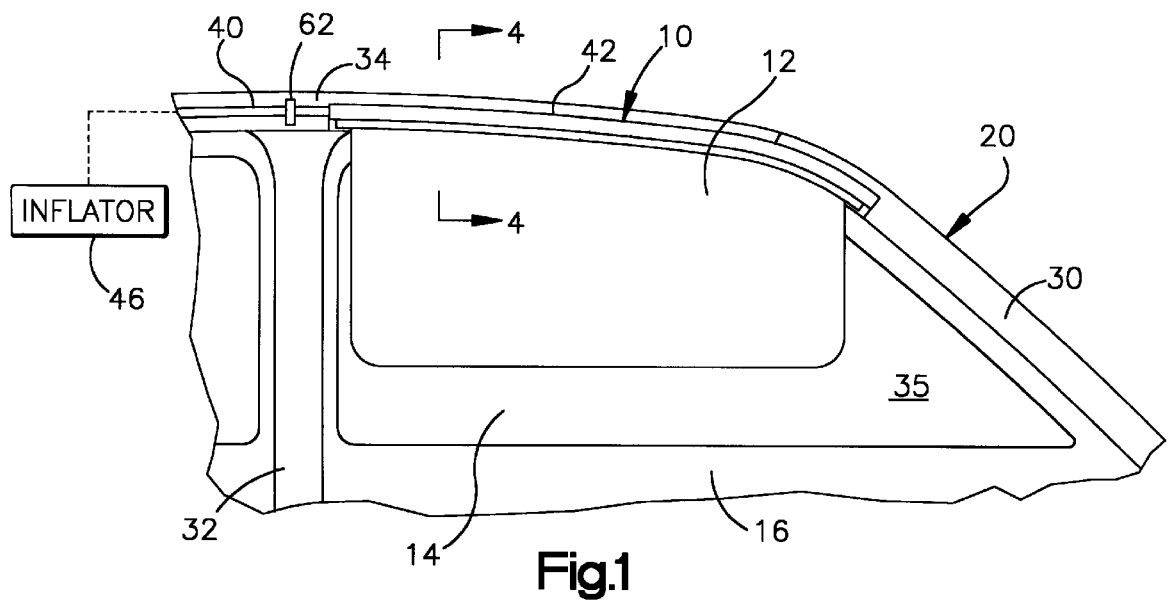
FIG. 1 is a partial view of a vehicle equipped with a vehicle occupant protection apparatus comprising a preferred embodiment of the present invention, with the apparatus being shown in an actuated condition.

A vehicle occupant protection apparatus 10 comprising a first embodiment of the present invention is shown partially in FIG. 1. The apparatus 10 includes a deployable protection device 12 in the form of an inflatable side curtain. When the side curtain 12 is in the deployed condition shown in FIG. 1, it extends across a window 14 in a door 16 at the side of the vehicle. The side curtain 12 is then interposed between a vehicle occupant and the window 14 to help restrain movement of the occupant outward of the window 14 under the influence of vehicle crash forces.

The apparatus 10 is mounted on the vehicle body 20. The body 20 has structural metal members including an A-pillar 30 at the forward end of the door 16, a B-pillar 32 at the rear end of the door 16, and a roof rail 34 above the door 16. Those parts 30, 32 and 34 of the body 20 are concealed from view in the vehicle occupant compartment 35 by an assembly of interior trim structures (not shown) including plastic panels and a head liner, as known in the art.

Figure 2:
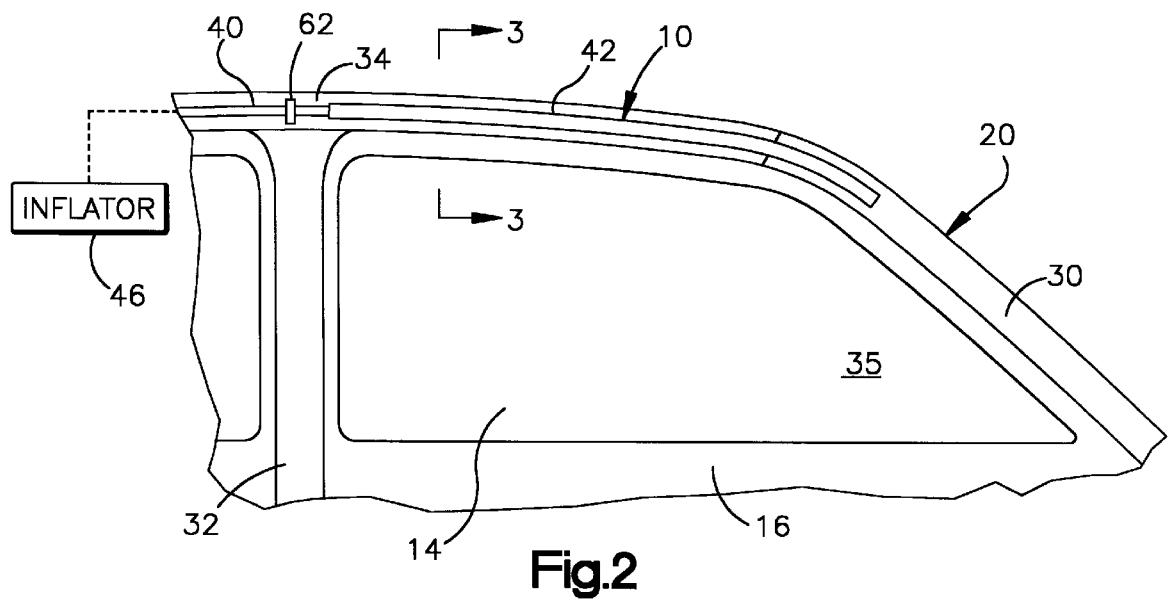
FIG. 2 is a view similar to FIG. 1 showing the apparatus in a non-actuated condition.

Other parts of the apparatus 10 include a conduit 40 and an elongated housing 42. The housing 42 extends partially along the roof rail 34 and partially along the A-pillar 30. The side curtain 12 is stored in the housing 42 under ordinary vehicle operating conditions, as indicated in FIG. 2. The conduit 40 communicates the side curtain 12 with an inflator 46 (shown schematically).

The inflator 46 comprises a source of inflation fluid for inflating the side curtain 12. As known in the art, the inflator 46 may contain an ignitable gas generating material for generating a large volume of gas. The inflator 46 may alternatively contain a stored quantity of pressurized inflation fluid, a combination of pressurized inflation fluid and ignitable material for heating the inflation fluid, or any other source of inflation fluid.

The inflator 46 is actuated in a known manner when the vehicle experiences a crash condition that meets or exceeds a specified threshold level of severity. Inflation fluid then flows through the conduit 40 from the inflator 46 to the side curtain 12 for inflation of the side curtain 12 to the deployed condition of FIG. 1.

As shown in FIG. 3, the housing 42 is a plastic structure with a generally cylindrical, tubular configuration. A plurality of external mounting bosses 50, one of which is shown in FIG. 3, are spaced apart in a row extending along the housing 42. A corresponding plurality of fasteners 52 at the mounting bosses 50 fasten the housing 42 to the roof rail 34 and the A-pillar 30 (FIGS. 1 and 2). A seam 54 in the housing 42 extends along the entire length of the housing 42. The seam 54 is defined by a pair of crimped edge portions 56 of the housing 42 that are releasably interlocked with each other.

The housing 42 and conduit 40 could be co-extruded. Also, the housing 42 and conduit 40 could be made by a blow molding process.

An outlet section 60 (FIG. 3) of the conduit 40 extends into the housing 42 along substantially the entire length of the side curtain 12 within the housing 42. Preferably, the conduit 40 is a one-piece plastic extrusion. By "one-piece" it is meant that the conduit 40 is a single unit exclusive of separate but joined elements. Moreover, the conduit 40 has a non-linear contour matching the non-linear contours of the adjacent portions of the roof rail 34 and the A-pillar 30, as shown in FIGS. 1 and 2. Although the conduit 40 is supported in part by the housing 42 and in part by a plurality of pipe clamps 62 (one of which is shown in FIGS. 1 and 2), it is rigid enough to retain the non-linear contour without support. In accordance with this feature of the present invention, the conduit 40 is preferably provided with the non-linear contour by the use of a hot forming process to avoid crimping of the conduit 40. Such a process can be performed in any suitable manner known in the art.

As further shown in FIG. 3, the cross-section of the conduit 40 is generally crescent shaped along the outlet section 60 of the conduit 40. Specifically, the entire conduit 40 is provided with a circular cross-section originally upon extrusion of the conduit 40. The crescent shaped cross-section is imparted to the outlet section 60 by indenting an elongated side portion 64 of the outlet section 60 in a hot forming process. This can be done either simultaneously or sequentially with formation of the non-linear contour of the conduit 40. A plurality of inflation fluid outlet openings 65, one of which also is shown in FIG. 3, are formed through the outlet section 60 in a row extending along the indented portion 64.

As shown schematically in FIG. 3, the side curtain 12 has a base portion 70 extending around the outlet section 60 of the conduit 40. The side curtain 12 further has a major body portion 72 which is stored in a folded, uninflated configuration adjacent to the indented portion 64 of the conduit 40. Any suitable arrangement of folds can be used to place the body portion 72 of the side curtain 12 in the uninflated condition in which it is shown schematically in FIG. 3.

The side curtain 12 may be constructed of one or more panels of any suitable material known in the art, including woven materials and plastic films. For example, the side curtain 12 may be constructed of panels formed of a nylon fabric which is coated with silicone. The panels are interconnected along seams that are formed by stitches, ultrasonic welds, adhesives, heat staking, or the like, depending on the particular material of which the panels are formed.

When the inflator 46 is actuated, as described above, it provides inflation fluid that quickly fills the conduit 40 and begins to flow into the side curtain 12 through the outlet openings 65 in the conduit 40. The inflation fluid is provided at flow rates that cause the fluid pressure within the conduit 40 to rise suddenly to elevated levels. The rising fluid pressure forces act outward against the conduit 40, and cause the indented portion 64 of the conduit 40 to deflect suddenly back outward to its original arcuate configuration, as shown in FIG. 4. When the indented portion 64 of the conduit 40 deflects transversely outward in this manner, it pushes the folded body portion 72 of the side curtain 12 against the housing 42 forcefully enough to disengage the crimped edge portions 56 of the housing 42 from each other. The housing 42 is thus opened under the influence of inflation fluid pressure forces acting on the conduit 40. As the inflation fluid continues to flow through the outlet openings 65, it unfolds and inflates the body 72 of the side curtain 12 to deploy the side curtain 12 outward from the housing 42, as further shown in FIG. 4.

Figure 5:
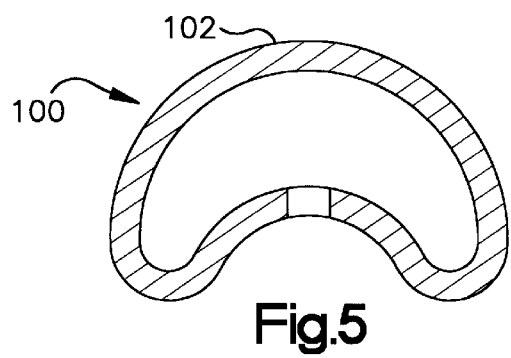
FIG. 5 is a view of a part of a vehicle occupant protection apparatus comprising a second embodiment of the invention.

A second embodiment of the present invention includes an alternative conduit 100 (FIG. 5) in place of the conduit 40 described above. Like the conduit 40, the conduit 100 has a non-linear contour at least partially matching the non-linear contours of the roof rail 34 and the A-pillar 30 (FIG. 1). The conduit 100 also has an outlet section 102 which, like the outlet section 60 of the conduit 40, has a crescent shaped cross-section. The conduit 100 is thus configured to be transversely extendible under the influence of inflation fluid pressure forces in the same manner as described above with reference to the conduit 40. However, the conduit 100 is a metal extrusion to which the non-linear and crescent shaped features are preferably imparted by the use of a cold forming process.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
    an inflatable vehicle occupant protection device;
    a housing containing said protection device, said housing having a seam; and
    a conduit configured to convey inflation fluid to said protection device;
    said conduit being deflectable under the influence of pressure forces applied by said inflation fluid;
    said conduit being located adjacent to said seam so as to transmit said pressure forces to said housing along said seam and thereby to open said housing along said seam upon deflecting under the influence of said pressure forces.

2. Apparatus as defined in claim 1 wherein said protection device is interposed between said conduit and said seam so as to transmit said pressure forces from said conduit to said housing along said seam.

3. Apparatus as defined in claim 1 wherein said conduit is a tubular extrusion.

4. Apparatus as defined in claim 1 wherein said conduit is transversely extendible under the influence of said pressure forces.

5. Apparatus as defined in claim 4 wherein said conduit has a crescent shaped cross-section.

6. Apparatus as defined in claim 5 wherein said protection device is stored in an uninflated condition in which a folded portion of said protection device is received in a recess defined by said crescent shaped cross-section of said conduit.

7. Apparatus comprising:
    an elongated vehicle member having a non-linear contour;
    an inflatable vehicle occupant protection device; and
    a conduit configured to convey inflation fluid to said protection device;
    said conduit comprising a tubular extrusion extending along said member, said tubular extrusion having a non-linear contour matching said non-linear contour of said member.

8. Apparatus as defined in claim 7 wherein said tubular extrusion is a plastic structure to which said non-linear contour has been imparted by a hot forming process.

9. Apparatus as defined in claim 8 wherein said tubular extension has a crescent shaped cross-section.

10. Apparatus as defined in claim 7 wherein said tubular extrusion is a metal structure to which said non-linear contour has been imparted by a cold forming process.

11. Apparatus as defined in claim 10 wherein said tubular extrusion has a crescent shaped cross-section.

* * * * *